J. N. SHAFER.
MULTIPLE COMPARTMENT INNER TUBE FOR AUTOMOBILE AND OTHER TIRES.
APPLICATION FILED SEPT. 11, 1919.
1,341,936. Patented June 1, 1920.
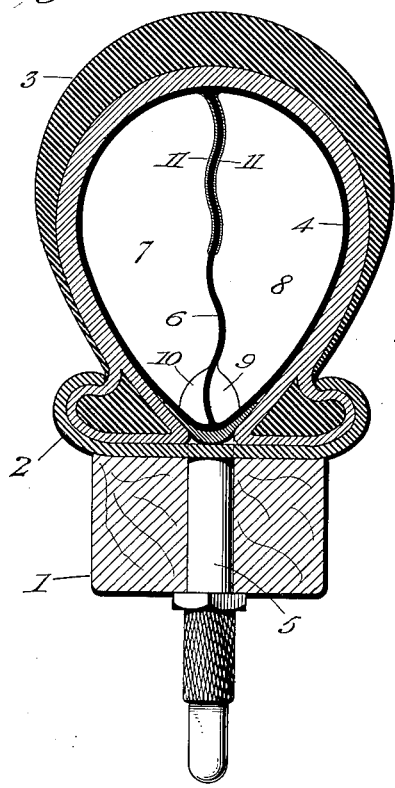
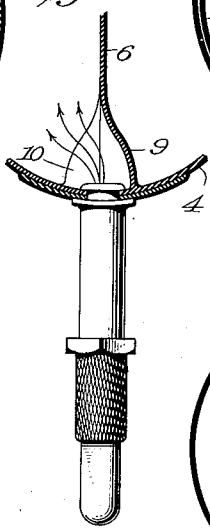
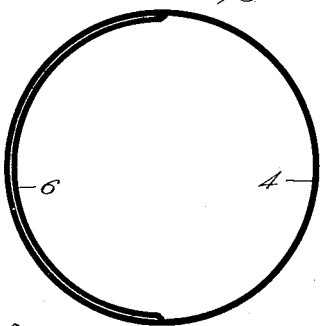
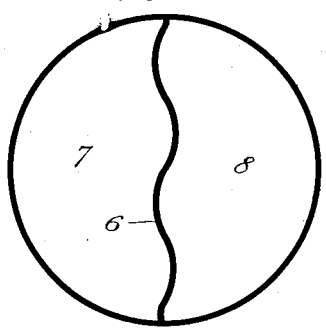
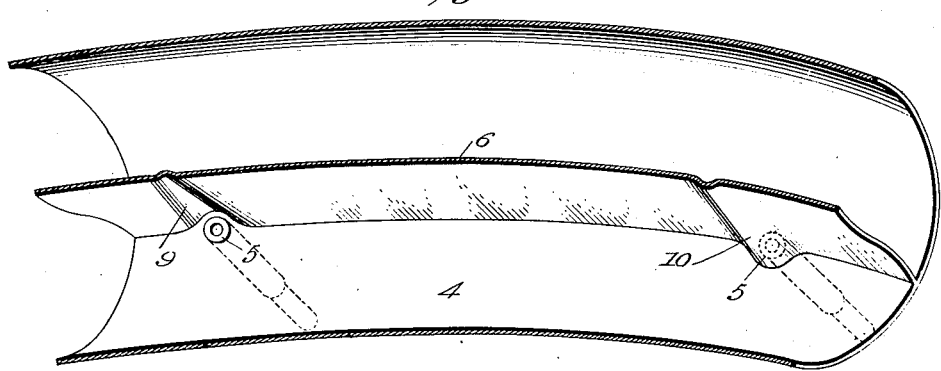
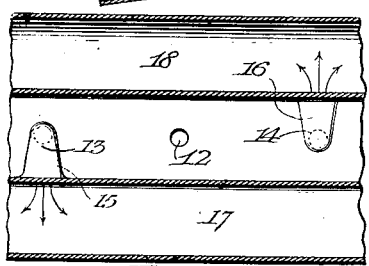
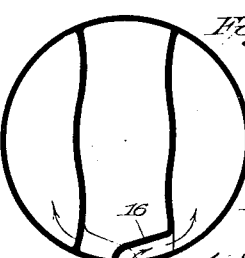
INVENTOR
By *James N. Shafer.*
*H. S. Bailey.* ATTORNEY

UNITED STATES PATENT OFFICE.

JAMES N. SHAFER, OF DENVER, COLORADO.

MULTIPLE-COMPARTMENT INNER TUBE FOR AUTOMOBILE AND OTHER TIRES.

1,341,936.  Specification of Letters Patent.  Patented June 1, 1920.

Application filed September 11, 1919. Serial No. 323,055.

*To all whom it may concern:*

Be it known that I, JAMES N. SHAFER, a citizen of the United States of America, residing at the city and county of Denver and State of Colorado, have invented a new and useful Multiple-Compartment Inner Tube for Automobile and other Tires, of which the following is a specification.

This invention relates to improvements in multiple compartment inner tubes for automobile and other tires.

The object of the invention is to provide an inner tube comprising two parallel, independent compartments.

Further to provide an inner tube having an endless elastic, central partition and air valves which enter the tube on opposite sides of the said partition, whereby the compartments formed by the partition are each supplied with air under pressure, the pressure in one compartment equalizing that in the other compartment, so that if one compartment should be punctured, the pressure in the other compartment would be sufficient to force the partition out against the wall of the tube, and hold the tire against flattening until air could be pumped into the nonpunctured compartment, and raise the pressure to the required degree.

These objects are accomplished by the device illustrated in the accompanying drawings in which:

Figure 1. is a transverse, sectional view through an automobile tire and the felly and rim of a wheel, the tire being provided with the improved type of tube.

Fig. 2. is a fragmentary, sectional view showing a portion of a tube and its partition and the air valve which is connected to said tube.

Fig. 3. is a transverse, sectional view, in diagram, of the tube, showing the appearance of the same when one compartment, only, is inflated.

Fig. 4. is a view similar to Fig. 3, but showing both compartments inflated.

Fig. 5. is a sectional perspective view through a portion of a tube, showing the partition, and air valves entering the tube on opposite sides of the partition.

Fig. 6. is a transverse sectional view, in diagram, illustrating a tube having three compartments, and, Fig. 7. is a central, longitudinal, sectional view of Fig. 6.

The numeral 1. indicates the felly of an automobile wheel, 2, the rim, and 3, the casing or tire, all of these parts being of common construction. Within the tire or casing is placed the improved multiple compartment tube 4, which is made of rubber, as is usual, and has the same external appearance as such tubes in general use, with the exception that it is provided with two air valves 5, instead of one. The tube is provided with a central, endless partition 6, which may form an integral part of the tube, or may be secured thereto by vulcanizing, and this partition divides the tube into two parallel, endless compartments 7 and 8, which are arranged side by side, the partition being vertically disposed. At points approximately six inches apart, the partition is bulged out slightly, in opposite directions, where its inner edge joins the inner lap of the tube, as shown most clearly at 9 and 10, Fig. 5, and these bulges permit the air valves 5, which must be in a direct line, to enter the tube on opposite sides of the partition, as will be clearly understood by reference to the said Fig. 5. The air valves 5, need no description, as they are of a form in common use, and extend through holes in the rim and felly of the wheel, in the usual manner, when the tube is placed in the tire. The partition 6, is of greater width than the diameter of the tube when expanded, and from its outer edge, when it joins the outer lap of the tube, to about midway of its width, it is preferably faced on each side with an endless strip 11, of suitable material, such as canvas, for a purpose to be presently explained. As the partition is of greater width than the diameter of the tube when expanded, it can be bulged out laterally in either direction, until it contacts with and conforms to the curvature of the tube, as clearly shown in Fig. 3, without being stretched or expanded. After placing the tube in the tire, in the usual manner, air is forced through one of the air valves 5, into one of the compartments 7 or 8, until a pressure of about fifty per cent. of the required pressure is obtained in the tube. This air pressure forces the partition over against one side of the tube, and causes it to conform to the curvature of the tube, as shown. Air under about twice the pressure now in the tube, is forced into the other air valve, and passes between the wall of the tube, and the partition which now is pressed against the same, and as this space becomes filled with air the partition is moved over to a central position within the tube, compressing the air behind it, until the pressure is equalized on the opposite side of the partition, in other words, the air under the initial pressure of say forty pounds, filled the whole tube, but as the partition is moved to a central position in the tube by an air pressure of eighty pounds on the opposite side of the partition, the air first admitted is forced into a space of one-half its original area, which raises its pressure to eighty pounds. It will thus be seen that the air in the tube is under a uniform pressure of eighty pounds, but the volume of air is divided, by the partition 6, into two separate and non-communicating bodies. Now, should a puncture occur on either side of the partition 6, say on the side comprising the compartment 7, the air will escape from this compartment, and during its escape, the partition will be forced out by the pressure on its opposite side, until it engages the side of the tube, thus obliterating the compartment 7. The whole tube is now occupied by the air originally contained in the compartment 8, and as the air now occupies twice the space it occupied before the puncture, its pressure is reduced one half, or forty pounds, but this pressure is sufficient to prevent flattening of the tire, with the consequent cutting of the tire by the rim, and thus the tire can be run on this reduced pressure, without injury to the same, should the puncture not be discovered. If the object causing the puncture passes diagonally through the tire and tube, and close enough to the partition to engage the same, the canvas 11, or other material on the said partition will deflect the object, and thus prevent it from penetrating the said partition, which, if it were penetrated, would permit the air to escape from both compartments.

In Figs. 6 and 7, is illustrated a modification of the tube in which two partitions are employed, dividing the tube into three parallel compartments. In this construction, three air valves would be used, one for the middle compartment and one for each of the side compartments. The three valves, however, would be in a direct line, and would all enter the middle compartment, through holes 12, 13, and 14, as shown in Fig. 7, but the holes 13 and 14 would open into housings or closed passage ways 15 and 16, respectively, leading into the side compartments 17 and 18, respectively, so that there would be no communication between the several compartments, and each compartment would be filled with air, independently of the other compartments.

Having described my invention, what I claim as new, and desire to secure by Letters Patent, is:

1. An inner tube for vehicle tires having a partition wall defining two co-extensive compartments and a separate valve connection for each compartment, the said valve connections being disposed substantially in the central radial plane of the tube and, the partition wall making connection with the tube along a line curved laterally from the general plane of the partition around one of the valve connections.

2. An inner tube for vehicle tires having a partition wall dividing the tube into separate co-extensive compartments and a separate valve connection for each compartment, the valve connections being disposed substantially in the central radial plane of the tube and the said partition wall making connection with the tube along a curved line passing around one valve connection at one side of the said radial plane and around the other valve connection at the other side of the said radial plane.

In testimony whereof I affix my signature in presence of two witnesses.

JAMES N. SHAFER.

Witnesses:
G. SARGENT ELLIOTT,
ELIZABETH SMITH.